United States Patent Office 2,915,484
Patented Dec. 1, 1959

2,915,484
SYNTHETIC RESINS AND PROCESS OF MAKING SAME

Rudolf Kohler, Dusseldorf, and Helmut Pietsch, Dusseldorf-Holthausen, Germany, assignors to Henkel & Cie. G.m.b.H., Dusseldorf-Holthausen, Germany, a corporation under the laws of Germany No Drawing. Application October 28, 1953
Serial No. 388,896

Claims priority, application Germany November 3, 1952

13 Claims. (Cl. 260—18)

This invention relates to synthetic resins and more particularly to thermosetting synthetic resins which can be hardened and cured at elevated temperature as well as to the completely hardened and cured synthetic resins obtained therefrom, and to a process of making same.

It is one object of this invention to provide new and improved thermosetting synthetic resins which at one stage in their manufacture are soluble and fusible and can be hardened and cured from this stage to infusible, completely hardened synthetic resins that are insoluble in organic solvents and possess extraordinary strength properties, said thermosetting synthetic resins being suitable for molding and casting, for the preparation of annealing lacquers and varnishes, as adhesives for wood, fibers, glass, metal, ceramic materials, and for many other purposes.

Another object of this invention is to provide new and improved infusible, non-brittle, completely hardened synthetic resins of light, amber-like color, excellent transparency, remarkable hardness, and high mechanical strength.

Still another object of this invention is to provide a process of making new and improved thermosetting hardenable resins as well as hardened and cured synthetic resins that are useful and applicable for many purposes.

Various other objects and advantages of our invention will become apparent as this description proceeds.

In principle, the hardenable, and also the hardened and cured synthetic resins of our invention are obtained by heating and condensing di- or polyepoxide compounds the epoxide oxygen of which is attached to a hydroaromatic residue, with polybasic carboxylic acids, their anhydrides, halogenides, especially chlorides, or other reactive acid derivatives. Preferably said condensation of di- or polyepoxide compounds with polybasic carboxylic acids is carried out with the addition of aliphatic epoxide compounds.

As compounds having hydroaromatically bound epoxide oxygen, we employ primarily compounds having at least two epoxy cyclohexane residues connected, in any desired manner, with lower or higher molecular residues. Such compounds can be produced, for instance, by hydrogenating corresponding aromatic hydroxyl compounds, splitting off water, and introducing an epoxide group into the resulting hydroaromatic olefines. To produce di- or polyepoxide compounds, aromatic compounds are used as starting materials which contain two or more phenolic residues in their molecule. As an example, for such compounds of a relatively low molecular weight bi-phenols and di-(hydroxy phenyl) propanes may be used. Aromatic hydroxy compounds of higher molecular weight which may also be used are obtained by condensing phenols and aldehydes, preferably formaldehyde, to so-called Novolaks, i.e. phenol-aldehyde condensation products of the resole type formed under acidic conditions. It is generally assumed that such Novolaks are polymers consisting of structural elements of the following formula

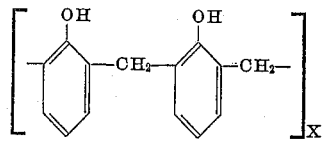

These and other aromatic hydroxy compounds are hydrogenated to the corresponding hydroaromatic hydroxy compounds and preferably to cyclohexanol derivatives by methods known to the art. To produce olefines from the resulting hydroaromatic hydroxy compounds and preferably from such cyclohexanol derivatives, water is split off. Especially suitable methods of hydrogenation and dehydrogenation are described, for instance, in German Patent No. 864,300 issued January 22, 1953 (German patent application No. H 2921 IVc/22h).

Conversion of hydroaromatic olefines obtained as described in said patent or in any other suitable manner, into the corresponding epoxide compounds may be effected primarily by two processes.

In one of the processes used for this purpose the olefine reaction component is treated with low molecular percarboxylic acids and especially with peracetic acid. It is of advantage to use a comparatively small amount of the said carboxylic acid and a large excess of hydrogen peroxide so that the percarboxylic acid formed and present in the reaction mixture acts as oxygen carrier. Another process of introducing the epoxide group into the hydroaromatic olefin compound consists in the addition of hypochlorous acid to the double bond and splitting off hydrogen chloride by means of alkali hydroxide.

It is to be understood, however, that not only hydroaromatic epoxide compounds which were produced according to the above described processes but also other hydroaromatic epoxide compounds may be used as starting material for carrying out the process of our invention.

The preferred epoxide compounds employed are the diepoxide of dicyclohexenyl propane of Formula I,

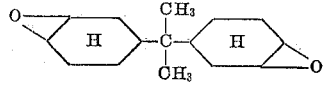

or the polyepoxide of Formula II obtained from a phenol formaldehyde condensate product,

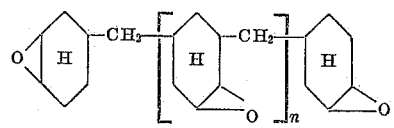

or the epoxide compounds obtained by splitting off water from perhydro di-(hydroxy phenyl) propane, so forming a compound of the general Formula III, into the cyclohexenyl rings of which epoxide oxygen atoms can be introduced.

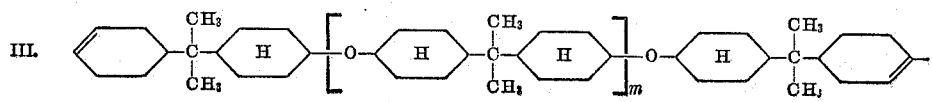

It is, of course, understood that the position of the epoxide oxygen atoms or of the hydroaromatic double bonds, respectively, and of the bridge members between the cyclohexane residues of Formulas I to III is indicated in the above given formulas in a purely arbitrary manner and serves only to illustrate the possible structure of the new starting materials used in this reaction. A common characteristic of all compounds useful in the process of our invention is the presence of the structural grouping IV IV. 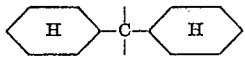

Since dehydration as well as introduction of epoxide groups into such compounds cannot be effected quantitatively, the resulting epoxide compounds in general contain less epoxide oxygen than would be expected when considering the number of phenolic hydroxyl groups present in the starting material. In the case of starting material containing only two phenolic hydroxyl groups or only two hydroaromatic double bonds, respectively, the epoxide compounds produced contain also certain amounts of monoepoxide compounds. It is not necessary to remove said monoepoxide compounds from the reaction mixture. Their presence, on subsequent hardening and curing of the synthetic resin, reduces the formation of cross-linkages and interlacing and, thus, contributes to a decrease in brittleness of the final resins.

When dehydrating and introducing epoxide groups into higher molecular compounds with more than two hydroaromatic double bonds, conversion or reaction, on introducing epoxide groups into the molecule, usually proceeds to such an extent that at least two double bonds are present in the resulting epoxide compounds. The epoxide oxygen content of said di- or polyepoxide compounds must be considered as a measure of the usefulness of said compounds for the purpose of this invention. Said epoxide oxygen content must be at least 1.2%. It has been found that the higher molecular di- or polyepoxide compounds illustrated by Formula II or obtainable from compounds of Formula III preferably should not contain, as an average, more than about 10 cyclohexane rings in their molecule, i.e. the letter "$n$" in Formula II indicates the integers 0 to 8 and the letter "$m$" in Formula III the integers 0 to 3.

Usually said hydroaromatic di- or polyepoxide compounds are processed together with mono-, di-, or polyepoxide compounds the epoxide oxygen of which is attached to an aliphatic residue. Said aliphatic residue serving as carrier for epoxide oxygen, can be of a different nature. For instance, a hydrocarbon radical, the radical of an alcohol, an ester, an acid, an ether, or of other compounds may be used. Two or more aliphatic residues may be connected with each other by means of cyclic residues. Compounds with aliphatically bound epoxide oxygen can be produced, for instance, by introducing the epoxide group into compounds having at least one double bond in their molecule. For this purpose the above described processes for the introduction of epoxide oxygen may be employed. Frequently the double bonds present in the aliphatic material are also not quantitatively converted into epoxide groups.

In most cases it is not necessary to remove nonreacted unsaturated starting material from the resulting epoxide compound. Such removal is necessary only when processing simple unsaturated compounds and, even then, only when the degree of epoxidation is considerably less than 80%. Frequently, it is sufficient to enrich the epoxidized reaction product to a concentration corresponding to a degree of epoxidation of about 80%. Since, on epoxidation, usually as complete a conversion of the double bonds as possible is strived for, a reaction product is obtained on epoxidation of polyolefinic compounds which contains, should the reaction not proceed quantitatively, small amounts of mono-epoxide compounds and almost no non-reacted starting material besides predominant amounts of di- and polyepoxide compounds. Especially suitable starting materials for said epoxidation reaction are compounds containing at least 8 and preferably 12 to 60 carbon atoms in their molecule. Products of natural origin, such as, for instance, linseed oil or sperm oil consisting to about one third glyceride of oleic acid and to about two thirds of the oleic acid ester of oleyl alcohol, are preferred starting materials. Unsaturated fatty acids or their derivatives as well as unsaturated alcohols, especially fatty alcohols, are also suitable. Furthermore, the use of such di- or polyepoxide compounds having a molecular structure which is similar to that of the usual plasticizers and softeners for plastics is preferred. It is understood that this involves compounds with aliphatically bound epoxide oxygen that contain aromatic residues, ether, or ester groups. This group of compounds comprises also epoxides which can be produced by epoxidation of esters of unsaturated alcohols with polybasic carboxylic acid, for instance, of esters of allyl alcohol or oleyl alcohol with phthalic acid, pyromellitic acid, succinic acid, adipic acid, sebacic acid, or by reaction of epichlorohydrin or other epoxide compounds having a mobile reactive halogen atom with salts of the above mentioned carboxylic acids. Compounds with aliphatically bound epoxide oxygen can be prepared by esterifying free hydroxyl groups of polyglycerols with hydrogen chloride and treating the resulting reaction products with alkali hydroxide.

A simple test will show whether a compound with aliphatically bound epoxide oxygen is a suitable reaction component in the process of this invention. All aliphatic epoxide compounds can be used which, on heating with the polybasic carboxylic acid to be used or with a mixture of such acids, which acids serve to cause hardening and curing of the epoxides according to the present invention, yield only fusible but not hardenable or only hardened or cured, i.e. non-fusible but relatively soft gels. Such gels can be resistant to compressive-load application. They have, however, only a low tensile strength and, above all, they possess a very low resistance to further breaking and tearing.

Suitable polybasic carboxylic acids to be reacted with said epoxide compounds are acids with at least 2 carbon atoms and preferably acids with 4 to 20 carbon atoms. Such acids may be of aliphatic, cycloaliphatic, or aromatic nature. As examples of such acids there are mentioned, for instance, maleic acid, succinic acid, adipic acid, sebacic acid, the various isomeric phthalic acids, or their hydrogenation products. Such acids may be used in the form of their anhydrides, halogenides, such as chlorides, or other reactive acid derivatives.

The properties of the resins to be produced according to the present invention can be considerably varied by proper selection of the starting materials. The greater the ester bonds resulting from reaction of epoxide oxygen and carboxyl groups present in the resin, the greater is the increase in hardness of said resin, and also the increase in brittleness. The number of the ester bonds present in the resin is dependent upon the molecular size of the polycarboxylic acid and upon the molecular size and the epoxide content of the epoxide component. Hydroaromatic diepoxide compounds with a high epoxide content are, for instance, diepoxides of dicyclohexene or of dicyclohexenyl propane. Diepoxides with a lower epoxide content are compounds corresponding to Formula III. Compounds of Formula II with lower epoxide contents may also be produced by incomplete epoxidation, especially if the letter "$n$" indicates a higher integer. Said factors determine which type and amounts of the compound with aliphatically bound epoxide oxygen atoms are to be added as plasticizing and softening components to the reaction mixture. The proper proportions of the starting components of the reaction mixture can readily be determined by preliminary experiments. Satisfactory results are usually achieved when using proportions whereby the hydroaromatic epoxide compound constitutes 20% to 75% by weight, the aliphatic epoxide compound 0% to 55% by weight, and the polybasic carboxylic acid or its reactive acid derivative, such as the anhydride or chloride, 20% to 45% by weight of the reaction mixture. It is advisable to adjust said proportions in such a manner that the number of carboxyl groups in the starting mixture does not exceed the number of epoxide oxygen atoms. If the number of carboxyl groups substantially exceeds that of the epoxide groups, water may be formed by esterification of free hydroxyl groups that may have been formed during the hardening reaction. Said water on such esterification causes formation of bubbles and blisters in the resinous compound.

The temperatures to be employed vary in accordance with the reactivity of the starting materials. They depend on the type of reaction product to be produced, whether the final hardened and cured resin is to be obtained directly in one operation or whether a soluble and fusible, hardenable intermediate condensation product is desired. Although a still fusible resin can be obtained with reaction temperatures between 150° C. and 200° C. when exposing the reaction mixture to such a temperature for a short time only, the reaction is much more readily controlled if it is carried out at temperatures between 60° C. and 140° C. and preferably between 80° C. and 120° C. for a longer period of time. In the production of intermediate condensation products, heating is advantageously continued until no more crystals are precipitated on cooling. Some gelatinization is observed, for instance on heating the reaction mixture at 100° C. for 10 minutes which produces condensation products by cleavage of the epoxide rings. Said condensation products finally yield, after passing through the intermediate stages, infusible resins which form a three-dimensional lattice and are insoluble in all solvents. To harden the intermediate reaction products obtained during said condensation, i.e. products which are not yet completely hardened and cured, or to directly produce completely hardened or cured resins, it is possible to operate at a temperature between 120° C. and 200° C. and preferably between 130° C. and 180° C. At these temperatures an infusible product is obtained within the short period of time of 10 to 30 minutes. Said product is insoluble in organic solvents. Its ultimate stress values can furthermore be improved considerably by heating said product at said last mentioned temperatures between 120° C. and 200° C. for 2 to 15 hours.

Synthetic resins produced according to the process of this invention are of light, amber-like color, of high transparency, and of remarkable hardness and mechanical strength without being brittle. The important feature of the process of our invention is that no by-products are set free during the reaction. Therefore, shrinkage on hardening is much less than when producing plastics by splitting off water, ammonia, carbon dioxide, and other by-products. For this reason the still fusible condensation products of our invention having low shrinkage characteristics can be used as resins for casting and molding. Solutions of our incompletely hardened or cured condensation products in organic solvents are well suited for the production of annealing lacquers or baking enamels as commonly used for protective coatings. These resins adhere to any kind of material such as, for instance, wood or other fibrous material, glass, metal, ceramic materials. Their adhesiveness to such materials is remarkably high. They are, therefore, very well suited for joining and cementing such materials not only with each other but also with materials of different nature. Highly resistant plastics may be obtained by mixing said fusible condensation products with fillers and subsequently hardening and curing such mixtures. Suitable fillers are, for instance, glass fibers or glass powder, metal powder, pigments, ceramic materials, inorganic oxides, and others.

The following examples serve to illustrate this invention without, however, limiting the same thereto. Examples 1 and 2 serve to illustrate the manner in which the epoxide compounds with hydroaromatically bound epoxide oxygen, used as starting materials for the process of this invention, are produced with the remaining examples are described as the production of the intermediate condensation products and the final infusible and insoluble synthetic resins.

The letters P, M, and A used in the tables of Examples 3 to 10 indicate the anhydride of phthalic acid, maleic acid, and adipic acid, respectively. The term "kg./sq. mm." indicates the shearing resistance of the adhesive bond between pure aluminum sheets except where a different material is explicitly stated in the examples.

In the Examples 3–5, the hardening times of the mixtures are given. These are the times necessary to harden the liquid or viscous starting materials at the temperatures given in the top of the tables. To prove the degree of the hardening reaction, a glass rod was put on the surface of the hot mixture. The mix was designated as hardened when it had formed a gel and the glass rod did not sink in under light pressure.

*Example 1*

340 g. of perhydro-di-(hydroxy phenyl) propane of the formula

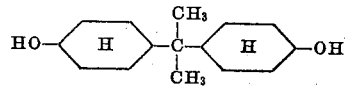

which may be obtained in the form of a crystallizing substance melting at 181°–182° C. by hydrogenating di-(hydroxy phenyl) propane, 4 g. of β-naphthalene sulfonic acid, and about 900 g. of a dehydrating agent produced by mixing equal parts of fused potassium bisulfate and dry sand followed, after cooling, by grinding, are heated in a vacuum of 100–150 mm. Hg at an inner temperature of 170°–180° C. in a flask having attached thereto at its top a 30 cm. long column which is connected with a very effective descending cooler. Almost the theoretical amount of water is split off within 1 to 2 hours. Only a small amount of hydrocarbon distills off along with said water. After cooling, the contents of the flask is dissolved in ether. The ethereal solution is washed to neutral reaction and is dried by means of calcium chloride. The ether is evaporated and the resulting residue is distilled in a vacuum. 8 g. of first runnings are obtained by distillation up to 98° C. at a vacuum of 1.8 mm. Hg. Thereafter 150–180 g. of the main fraction distill between 98° and 111° C. and mainly between 100° and 101° C. at a vacuum of 1.8 mm. Hg. About 50 g. of a ropy soft resin remain as residue. The main fraction, representing a mixture of isomeric dicyclohexenyl propane, has an iodine number of 240–246, i.e. almost corresponding to the theoretical iodine number of 249. It is a readily mobile liquid of characteristic odor which solidifies in solid carbon dioxide, but does not crystallize therein.

500 g. of said dicyclohexenyl propane are mixed with 500 cc. of ether and the mixture is added drop by drop to a mixture of 620 g. of 61% peracetic acid solution in acetic acid and 1500 cc. of ether. The temperature, at the beginning of the addition of said peracetic acid solution, is 0° C. During addition of said peracetic acid solution care must be taken by cooling that a reaction temperature of 25°–28° C. is maintained. After all the peracetic acid solution has been added and after the exothermic main reaction has ceased or died down, the reaction mixture is allowed to stand at room temperature for 3 to 6 days. Acetic acid and excess peracetic acid are then removed by washing and the crude epoxide compound is distilled in a vacuum. 90 g. of first runnings, distilling at 120°–135° C. and under a vacuum of 2.3–2.5 mm. Hg, are obtained. Said first runnings have an epoxide oxygen content of only 2.7%. The main fraction yields 140 g. which distill between 140° and 160° C. under a vacuum of 0.8–1.2 mm. Hg and have an epoxide oxygen content of 11%. 50 g. of tails distill at 160°–165° C. under a vacuum of 1 mm. Hg with an epoxide oxygen content of 10%. 155 g. of a residue with an epoxide oxygen content of 4% remain. Said residue is a yellowish resin which is brittle at room temperature. The main fraction and tails are colorless and viscous at room temperature.

*Example 2*

A hydrogenated Novolak obtained by condensing phenol and formaldehyde in acid medium is subjected to dehydration according to the process of German Patent No. 864,300 (German patent application No. H 2921 IVc/22h).

150 g. of such a resin having an iodine number of 170 are dissolved in 400 cc. of dry ether and are allowed to flow into a mixture of 136 g. of 58% peracetic acid in acetic acid and 500 cc. of ether. The temperature of the reaction mixture at the beginning of the addition of said peracetic acid solution is 0° C. During reaction, a temperature of 25°–30° C. is maintained. The mixture is allowed to stand for 2 days whereafter 13 g. of unreacted peracetic acid remain. Working up the reaction mixture proceeds as described in Example 1. Distillation is effected at 100° C. under a vacuum of 2 mm. Hg whereby a light yellow resin is formed which melts at about 80° C. and which is still soft but not fluid at room temperature. Its analytical data or characteristic factors, respectively, are

| | |
|---|---|
| Iodine number | 9 |
| Acid number | 0 |
| Hydroxyl number (after deduction of epoxide oxygen) | 110 |
| Molecular weight | 420 |
| Epoxide oxygen content percent | 4.8 |
| Saponification number | 20 |

*Example 3*

2 parts by weight of the main fraction of Example 1, 1 part by weight of phthalic acid anhydride, and 1 part by weight of epoxidized linseed oil, obtained in a known manner by peracetic acid oxidation of linseed oil, are melted together and are subjected to a hardening treatment by heating to 120°–130° C. A bubble and blister-free solid, elastic, transparent plastic material of faintly yellowish color is produced thereby, almost without any contraction.

Other mixing proportions and the properties of the resins obtained therewith are given in the following table:

| Main fraction according to Ex. 1, Parts by weight | Linseed oil epoxide, Parts by weight | P, Parts by weight | Hardening time, Minutes | Characterization of the resin hardened at 130° C. for 12 hours after cooling |
|---|---|---|---|---|
| 2.3 | 2.5 | 2.0 | 50 | not hard, ductile, very strong and adhering. |
| 2.3 | 2.5 | 1.5 | 75 | Do. |
| 2.3 | 1 | 1.7 | 50 | hard, strong, not brittle. |
| 2.3 | 4 | 3.5 | 40 | soft, ductile, very strong and viscous. |

*Example 4*

In general, softer resins are obtained with adipic acid anhydride when reacting in the same proportion as described in Example 3.

| No. | Main fraction according to Ex. 1, Parts by weight | Linseed oil epoxide, Parts by weight | A, Parts by weight | Characterization of the resin hardened 12 hours at 130° C., after cooling |
|---|---|---|---|---|
| 1 | 2.3 | 2.5 | 2.7 | soft, flexible, elastic product. |
| 2 | 2.3 | 1.0 | 1.7 | not completely hardened, very viscous, very strong and elastic. |
| 3 | 2.3 | 0.5 | 1.0 | harder than resin 2 but otherwise very similar. |

The hot, still fluid condensation products of Examples 3 and 4 are applied to pure aluminum sheets of 2 mm. thickness and 20 mm. width and the coated sheets are pressed together while heating. Hardening and curing an area of 2 sq. cm. covered by said adhesive requires 6 hours at 130° C. and yields adhesive bonds of a shearing resistance up to 2 kg./sq. mm.

*Example 5*

An aliphatic polyepoxide compound is produced, for instance, by heating to 70°–90° C. 1 mol of glycerol with 3 mols of epichlorohydrin in the presence of 0.3% of tin tetrachloride, calculated for the total weight of the mixture. Hydrochloric acid is then split off from the resulting chlorohydrin ether by means of alkali alcoholate in alcohol. After working up the reaction mixture in the usual manner a resin is obtained which has an epoxide oxygen content of 6–8% and cannot be distilled. Said aliphatic polyepoxide compound is hardened and cured together with the hydroaromatic epoxide compound of the main fraction obtained according to Example 1, and with a polybasic acid anhydride, such as phthalic acid or adipic acid under the conditions given in the following table whereby resins of varying properties are produced. The figures given for the shearing resistance apply to adhesive bonds between soft aluminum.

| No. | Main Fraction according to Ex. 1, Parts by weight | Aliphatic polyepoxide of Ex. 5, Parts by weight | Acid anhydride, Parts by weight | Hardening time, Minutes | Characterization of the resin hardened at 130° C. for 6 hours after cooling |
|---|---|---|---|---|---|
| 1 | 2.3 | 2.5 | 2.0 P | 10 | bubble and blister-free, yellowish, not contracted, hard, elastic, not brittle, 1.2–1.4 kg./sq. mm. |
| 2 | 2.3 | 1.0 | 1.7 P | 10 | harder and more brittle, otherwise like resin 1, 1.0–1.1 kg./sq. mm. |
| 3 | 2.3 | 1.0 | 1.7 A | 60–120 | solid, elastic, bubble and blister-free, 2.0–2.3 kg./sq. mm. |
| 4 | 2.3 | 0.5 | 1.0 A | 60–120 | like resin 3, 1.8–1.9 kg./sq. mm. |

*Example 6*

The diepoxide of dioleyl phthalate is prepared, for instance, by epoxidation of dioleyl phthalate with peracetic acid in ether according to known methods. By reacting a mixture of the hydroaromatic epoxide of the main fraction of Example 1 and said diepoxide of dioleyl phthalate with a dibasic carboxylic acid anhydride, such as phthalic acid anhydride or adipic acid anhydride in the proportions and under the conditions given in the following table; resins of different properties are obtained as is also shown in said table.

| No. | Main fraction according to Ex. 1, Parts by weight | Diepoxide of dioleyl phthalate, Parts by weight | Acid anhydride, Parts by weight | Characterization of the resin hardened at 130° C. for 6 hours after cooling |
|---|---|---|---|---|
| 1 | 2.3 | 2.5 | 2.0 P | Soft, viscous, bubble and blister-free resin. |
| 2 | 2.3 | 1.0 | 1.7 P | hard and brittle. |
| 3 | 2.3 | 1.0 | 1.7 A | hardened and cured without contraction to a completely impact-resistant, firmly adhering resin, 1.4–1.6 kg./sq. mm. |
| 4 | 2.3 | 0.5 | 1.0 A | like resin 3, 1.3–1.8 kg./sq. mm. |

Example 7

The hydroaromatic epoxide compound according to Example 2 is reacted with linseed oil epoxide and acid anhydrides under the conditions given in the following table:

| No. | Resin of Ex. 2, Parts by weight | Linseed oil epoxide, Parts by weight | Acid anhydride, Parts by weight | Characterization of the resin hardened at 130° C. for 6 hours after cooling |
|---|---|---|---|---|
| 1 | 2 | 2 | 1.5 P | Solid, elastic, transparent, 0.9–1.2 kg./sq. mm. |
| 2 | 2 | 1.5 | 1.0 P | Like resin 1. |
| 3 | 2 |  | 0.7 A | Solid, hard, somewhat brittle. |
| 4 | 2 | 1.4 | 1.0 A | Solid, elastic, hard, hardened without contraction, 1.2–1.4 kg./sq. mm. |

Example 8

Oleyl alcohol is epoxidized with peracetic acid and the resulting epoxide alcohol is hardened together with the tails of Example 1 and acid anhydrides. Proportions, qualitative characterization, and shearing resistance of the adhesive bond of the resulting resins between soft aluminum sheets of 2 mm. thickness are shown in the following table:

| No. | Tails of Ex. 1, Parts by weight | Epoxide of oleyl alcohol, Parts by weight | Acid anhydride, Parts by weight | Characterization of the resin hardened at 130° C. for 6 hours, after cooling |
|---|---|---|---|---|
| 1 | 2.3 | 1.5 | 2 P | Solid, bubble and blister-free, hard, somewhat brittle. |
| 2 | 2.3 | 1.0 | 1.5 P | Like resin 1 but more solid and elastic, resistant to powerful blows with a hammer when placed on a hard support, 0.8–1.1 kg./sq. mm. |
| 3 | 2.3 | 2 | 2.3 M | Bubble and blister-free, of light color, elastic, not as solid as resin 2, metal-like fracture. |
| 4 | 2.3 | 1.5 | 2.0 M | Like resin 3. |
| 5 | 2.3 | 1.0 | 1.5 M | Ductile, hard, resistant to blows with a hammer, 1.25–1.5 kg./sq. mm. |

Example 9

3.5 parts by weight of the main fraction of Example 1, 3 parts of the diepoxide of dioleyl phthalate, and 3 parts by weight of phthalic acid anhydride are melted together. 100%, 50% and 25%, respectively, of pounded glass wool are added to said molten mass while heating. The mixture is hardened and cured at 130° C. for 6 hours and yields whitish to yellowish, opaque products of very high mechanical durability and strength.

Example 10

The resins and mixtures of Examples 1 to 9 are also suitable as adhesives for joining and cementing duraluminium. The ultimate stress values obtained thereby are given in the following table:

| No. | Main fraction according to Ex. 1, Parts by weight | Linseed oil epoxide, Parts by weight | Acid anhydride, Parts by weight | Pot-life at 130° C., Minutes | Characterization of the resin hardened at 130° C. for 12 hours | |
|---|---|---|---|---|---|---|
| | | | | | in the hot state | after cooling |
| 1 | 2.3 | 2.5 | 1.5 P | 40 | hard solid | hard, elastic, 1.2–1.4 kg./sq. mm. |
| 2 | 2.3 | 1.0 | 1.7 A | 10 | hard elastic | bubble and blister-free, solid, elastic, 1.6–2.0 kg./sq. mm. |
| 3 | 2.3 | 2.0 | 2.0 M | 20 | hard solid clear | resistant to blows with a hammer, elastic, 2.2–2.8 kg./sq. mm. |

Example 11

12 parts by weight of the main fraction of Example 1 are mixed with 12 parts by weight of linseed oil epoxide, 4 parts by weight of phthalic acid anhydride, and 4 parts by weight of adipic acid anhydride. The mixture is dissolved in an equal volume of acetone and is applied to metal sheets. The solvent is allowed to evaporate at 60° C. in a dry air current and the areas to be cemented together are united by means of screw clamps under light pressure. Sufficiently strong metals when united in this manner show, after hardening and curing at 130° C. for 6–8 hours, a shearing resistance of the adhesive bond up to 3.0 kg./sq. mm.

The term "reactive acid derivative of a polybasic carboxylic acid" or "reactive polybasic carboxylic acid compound," used in the specification and the claims annexed thereto, comprises any polybasic carboxylic acid compound capable of reacting with epoxide groups. Such compounds may be the free polybasic carboxylic acids themselves and, as preferred agents, their anhydrides, or their poly halogenides and especially their poly chlorides or their poly esters, poly amides, acid esters, acid amides and the like.

While we have described illustrative embodiments and examples of our invention it will be understood that various modifications and changes may be made in the embodiments and examples given, without departure from the spirit of our invention and within the scope of the following claims.

We claim:
1. In a process of producing synthetic resins, the step comprising heating a compound having at least two hydroaromatically bound epoxide oxygen atoms in its molecule, having a general structural formula selected from the group consisting of

I.

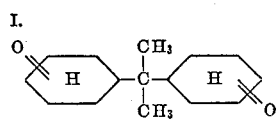

II.

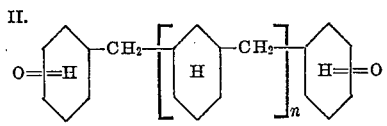

III.

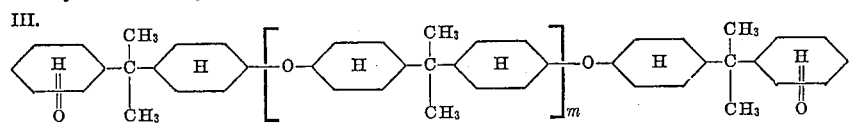

wherein =O represents a 1,2 epoxy group, $n$ is a whole number of 0 to 8 and $m$ is a whole number from 0 to 3, with a reactive acid derivative of a polycarboxylic acid, having from 2 to 20 carbon atoms, said derivative being selected from the group consisting of anhydrides and acid halides of said polycarboxylic acids.

2. In a process of producing synthetic resins, the step comprising heating a compound having at least two hydroaromatically bound epoxide oxygen atoms in its molecule, having a general structural formula selected from the group consisting of:

I.

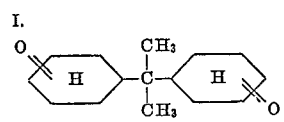

II.

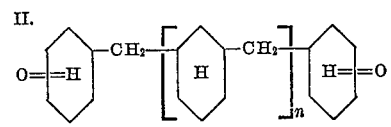

III.

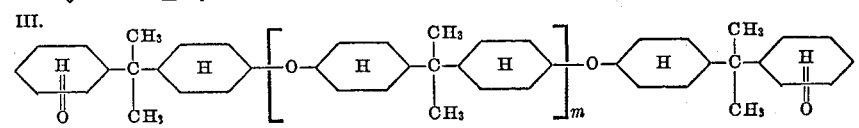

wherein =O represents a 1,2 epoxy group, $n$ is a whole number from 0 to 8 and $m$ is a whole number from 0 to 3, and a compound having aliphatically bound epoxide oxygen atoms in its molecule, selected from the group consisting of epoxidized reaction products of ethylenically unsaturated higher fatty acids, higher fatty alcohols, aliphatic mono-, di- and trihydric esters of higher unsaturated fatty acids wherein the said reaction product contains at least one 1,2 epoxy group, with a reactive acid derivative of a polycarboxylic acid, having from 2 to 20 carbon atoms, said derivative being selected from the group consisting of anhydrides and acid halides of said polycarboxylic acids.

3. In a process of producing synthetic resins, the step comprising heating the diepoxide of dicyclohexenyl propane with a reactive acid derivative of a polycarboxylic acid, having from 2 to 20 carbon atoms, said derivative being selected from the group consisting of anhydrides and acid halides of said polycarboxylic acids.

4. In a process of producing synthetic resins, the step comprising heating the diepoxide of dicyclohexenyl propane and a compound having aliphatically bound epoxide oxygen atoms in its molecule, selected from the group consisting of epoxidized reaction products of ethylenically unsaturated higher fatty acids, higher fatty alcohols, aliphatic mono-, di- and trihydric esters of higher unsaturated fatty acids wherein the said reaction product contains at least one 1,2 epoxy group, with a reactive acid derivative of a polycarboxylic acid, having from 2 to 20 carbon atoms, said derivative being selected from the group consisting of anhydrides and acid halides of said polycarboxylic acids.

5. In a process of producing synthetic resins, the step comprising heating an epoxidation product of a higher molecular product obtained on splitting off water from perhydro-di-(hydroxy phenyl) propane to form a product containing ethereal oxygen and a cyclohexenyl ring, with a reactive acid derivative of a polycarboxylic acid, having from 2 to 20 carbon atoms, said derivative being selected from the group consisting of anhydrides and acid halides of said polycarboxylic acids.

6. In a process of producing synthetic resins, the step comprising heating an epoxidation product of a higher molecular product obtained on splitting off water from perhydro-di-(hydroxy phenyl) propane to form a product containing ethereal oxygen and a cyclohexenyl ring, and a compound having aliphatically bound epoxide oxygen atoms in its molecule, selected from the group consisting of epoxidized reaction products of ethylenically unsaturated higher fatty acids, higher fatty alcohols, aliphatic mono-, di- and trihydric esters of higher unsaturated fatty acids wherein the said reaction product contains at least one 1,2 epoxy group, with a reactive acid derivative of a polycarboxylic acid, having from 2 to 20 carbon atoms, said derivative being selected from the group consisting of anhydrides and acid halides of said polycarboxylic acids.

7. In a process of producing synthetic resins, the step comprising heating a hydroaromatic epoxide compound obtained by epoxidation of a perhydrogenated phenol-aldehyde Novolak from which water was split off, with a reactive acid derivative of a polycarboxylic acid, having from 2 to 20 carbon atoms, said derivative being selected from the group consisting of anhydrides and acid halides of said polycarboxylic acids.

8. In a process of producing synthetic resins, the step comprising heating a hydroaromatic epoxide compound obtained by epoxidation of a perhydrogenated phenol-aldehyde Novolak from which water was split off, and a compound having aliphatically bound epoxide oxygen atoms in its molecule, selected from the group consisting of epoxidized reaction products of ethylenically unsaturated higher fatty acids, higher fatty alcohols, aliphatic mono-, di- and trihydric esters of higher unsaturated fatty acids wherein the said reaction product contains at least one 1,2 epoxy group, with a reactive acid derivative of a polycarboxylic acid, having from 2 to 20 carbon atoms, said derivative being selected from the group consisting of anhydrides and acid halides of said polycarboxylic acids.

9. In a process of producing synthetic resins, the step comprising heating a compound having at least two hydroaromatically bound epoxide oxygen atoms in its molecule, having a general structural formula selected from the group consisting of

I.

II.

III.

wherein =O represents a 1,2 epoxy group, $n$ is a whole number from 0 to 8 and $m$ is a whole number from 0 to 2, and a compound having aliphatically bound epoxide oxygen atoms in its molecule, selected from the group consisting of epoxidized reaction products of ethylenically unsaturated higher fatty acids, higher fatty alcohols, aliphatic mono-, di- and trihydric esters of higher unsaturated fatty acids wherein the said reaction product contains at least one 1,2 epoxy group, with an anhydride of a polycarboxylic acid, said hydroaromatic epoxide compound being present in said reaction mixture in an amount of between 20% and 75% by weight, said aliphatic epoxide compound being present therein in an amount of between 0% and 55% by weight, and said anhydride being present therein in an amount of between 20% and 45% by weight, the number of carboxyl groups in the reaction mixture not substantially exceeding the number of epoxide oxygen atoms, to a temperature between about 60° C. and 200° C. for at least such a period of time that, on cooling, no precipitation of crystalline products takes place in the reaction mixture.

10. As a new synthetic resin, the condensation product of a compound having at least two hydroaromatically bound epoxide oxygen atoms in its molecule, having a general structural formula selected from the group consisting of

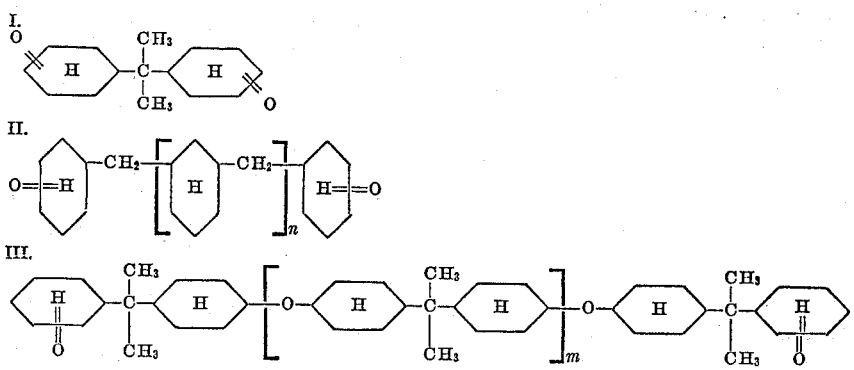

wherein =O represents a 1,2 epoxy group, $n$ is a whole number from 0 to 8 and $m$ is a whole number from 0 to 3, with a reactive derivative of a polycarboxylic acid compound, having from 2 to 20 carbon atoms, said derivative being selected from the group consisting of anhydrides and acid halides of said polycarboxylic acids, the number of epoxide oxygen atoms in said condensation product substantially corresponding to the number of carboxyl groups present therein.

11. As a new synthetic resin, the condensation product of a mixture of a compound having at least two hydroaromatically bound epoxide oxygen atoms in its molecule, having a general structural formula selected from the group consisting of

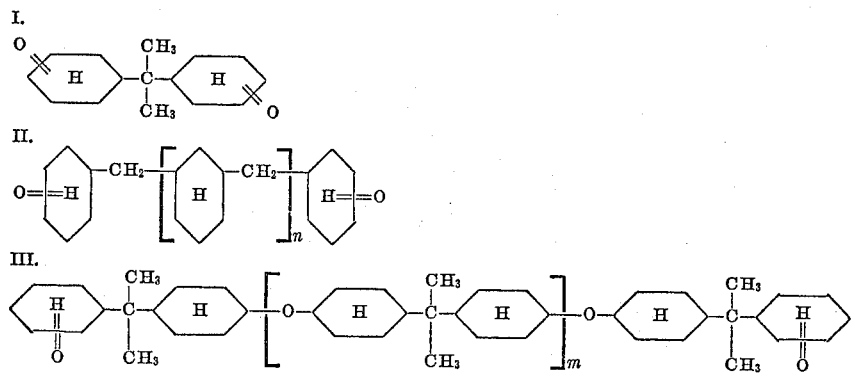

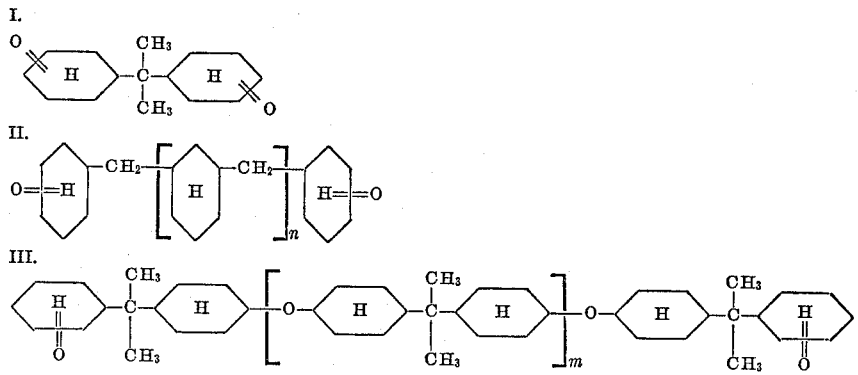

wherein =O represents a 1,2 epoxy group, $n$ is a whole number from 0 to 8 and $m$ is a whole number from 0 to 3, and a compound having aliphatically bound epoxide oxygen atoms in its molecule, selected from the group consisting of epoxidized reaction products of ethylenically unsaturated higher fatty acids, higher fatty alcohols, aliphatic mono-, di- and trihydric esters of higher unsaturated fatty acids wherein the said reaction product contains at least one 1,2 epoxy group, with a reactive derivative of a polycarboxylic acid compound, having from 2 to 20 carbon atoms, said derivative being selected from the group consisting of anhydrides and halides, the number of epoxide oxygen atoms in said condensation product substantially corresponding to the number of carboxyl groups present therein.

12. As a new synthetic resin, the condensation product of a di-(epoxy cyclohexane) propane having between about 10% and about 11% of epoxide oxygen, epoxidized linseed oil, and an anhydride selected from the group consisting of phthalic acid anhydride, adipic acid anhydride, maleic acid anhydride, and mixtures of said anhydrides, said resin, on hardening at about 130° C., yielding a bubble- and blister-free solid, elastic, transparent, lightly colored plastic material, said resin, in the pre-hardened state, being useful as adhesive for various materials, the adhesive bond obtained on application of said adhesive to aluminum sheets and hardening, having a shearing resistance of at least about 1.0 kg./sq.mm.

13. As a new synthetic resin, the condensation product of a (1) hydroaromatic epoxide compound obtained by perhydrogenating phenol-formaldehyde Novolak condensation product, splitting off water from said perhydrogenated Novolak, and epoxidizing the double bonds formed thereby in said perhydrogenated Novolak, (2) an epoxidized linseed oil, and (3) an anhydride selected from the group consisting of phthalic acid anhydride, adipic acid anhydride, maleic acid anhydride and mixtures of said anhydrides, said resin, on hardening at about 130° C., yielding a bubble- and blister-free, solid, elastic, transparent, lightly colored plastic material, said resin, in the pre-hardened state, being useful as adhesive for various materials, the adhesive bond obtained on application of said adhesive to aluminum sheets and hardening, having a shearing resistance of at least about 1.0 kg./sq. mm.

References Cited in the file of this patent

UNITED STATES PATENTS

| | | |
|---|---|---|
| 2,515,758 | Cukier | July 18, 1950 |
| 2,543,419 | Niederhauser | Feb. 27, 1951 |
| 2,574,536 | De Groote et al. | Nov. 13, 1951 |
| 2,623,023 | Koroly | Dec. 23, 1952 |
| 2,637,716 | Ott | May 5, 1953 |
| 2,712,535 | Fisch | July 5, 1955 |
| 2,768,153 | Shokal | Oct. 23, 1956 |

FOREIGN PATENTS

| | | |
|---|---|---|
| 154,821 | Sweden | June 12, 1956 |